United States Patent
Koren et al.

(10) Patent No.: US 11,836,083 B2
(45) Date of Patent: Dec. 5, 2023

(54) MEMORY ACCESS TRACKING USING A PERIPHERAL DEVICE

(71) Applicant: Mellanox Technologies, Ltd., Yokneam (IL)

(72) Inventors: Ran Avraham Koren, Beijing (CN); Ariel Shahar, Jerusalem (IL); Liran Liss, Atzmon (IL); Gabi Liron, Yokneam Illit (IL); Aviad Shaul Yehezkel, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/536,141

(22) Filed: Nov. 29, 2021

(65) Prior Publication Data

US 2023/0133439 A1 May 4, 2023

(30) Foreign Application Priority Data

Nov. 3, 2021 (CN) .......................... 202111296474.1

(51) Int. Cl.
G06F 12/0882 (2016.01)
G06F 13/16 (2006.01)
G06F 12/0831 (2016.01)

(52) U.S. Cl.
CPC ...... *G06F 12/0882* (2013.01); *G06F 12/0833* (2013.01); *G06F 12/0835* (2013.01); *G06F 13/1673* (2013.01)

(58) Field of Classification Search
None
See application file for complete search history.

(56) References Cited

U.S. PATENT DOCUMENTS

| | | |
|---|---|---|
| 8,255,475 B2 | 8/2012 | Kagan et al. |
| 8,745,276 B2 | 6/2014 | Bloch et al. |
| 8,914,458 B2 | 12/2014 | Raindel et al. |
| 9,298,642 B2 | 3/2016 | Kagan et al. |
| 9,361,145 B1 * | 6/2016 | Wilson .................... G06F 13/28 |
| 9,552,233 B1 * | 1/2017 | Tsirkin ................. G06F 9/4856 |
| 9,639,464 B2 | 5/2017 | Eran et al. |
| 10,496,595 B2 | 12/2019 | Degani et al. |
| 10,708,240 B2 | 7/2020 | Menachem et al. |

(Continued)

OTHER PUBLICATIONS

Ben-Ishay et al., U.S. Appl. No. 17/372,466, filed Jul. 11, 2021.

(Continued)

*Primary Examiner* — Yaima Rigol
(74) *Attorney, Agent, or Firm* — KLIGLER & ASSOCIATES PATENT ATTORNEYS LTD

(57) ABSTRACT

A compute node includes a memory, a processor and a peripheral device. The memory is to store memory pages. The processor is to run software that accesses the memory, and to identify one or more first memory pages that are accessed by the software in the memory. The peripheral device is to directly access one or more second memory pages in the memory of the compute node using Direct Memory Access (DMA), and to notify the processor of the second memory pages that are accessed using DMA. The processor is further to maintain a data structure that tracks both (i) the first memory pages as identified by the processor and (ii) the second memory pages as notified by the peripheral device.

21 Claims, 2 Drawing Sheets

(56) References Cited

U.S. PATENT DOCUMENTS

| | | | |
|---|---|---|---|
| 10,884,790 B1* | 1/2021 | Saidi | G06F 12/1027 |
| 10,956,202 B1* | 3/2021 | Sicron | G06F 3/0664 |
| 2007/0180161 A1* | 8/2007 | Asada | G06F 13/28 |
| | | | 710/22 |
| 2012/0159101 A1* | 6/2012 | Miyoshi | G06F 12/109 |
| | | | 711/E12.103 |
| 2012/0179855 A1* | 7/2012 | Tsirkin | G06F 9/45558 |
| | | | 711/6 |
| 2014/0181461 A1* | 6/2014 | Kegel | G06F 12/0891 |
| | | | 711/206 |
| 2016/0253197 A1* | 9/2016 | Bonzini | G06F 12/0893 |
| | | | 718/1 |
| 2016/0292813 A1* | 10/2016 | Bittner | G06T 1/60 |
| 2016/0350236 A1* | 12/2016 | Tsirkin | G06F 12/1081 |
| 2017/0046185 A1* | 2/2017 | Tsirkin | G06F 12/1009 |
| 2017/0083465 A1* | 3/2017 | Jan | G06F 3/0647 |
| 2021/0165675 A1* | 6/2021 | Wang | G06F 9/45558 |
| 2021/0224210 A1* | 7/2021 | Ouyang | G06F 9/4411 |

OTHER PUBLICATIONS

Oved et al., U.S. Appl. No. 17/503,392, filed Oct. 18, 2021.
Bar-Ilan et al., U.S. Appl. No. 17/234,189, filed Apr. 19, 2021.

* cited by examiner

MEMORY ACCESS TRACKING USING A PERIPHERAL DEVICE

FIELD OF THE INVENTION

The present invention relates generally to computing systems, and particularly to methods and systems memory management.

BACKGROUND OF THE INVENTION

Computing systems commonly track access to memory pages by hardware or software. Depending on the application or use-case, a computing system may track only write-access, i.e., only memory-access operations that modify memory pages, or both read- and write-access. Memory-page tracking is useful in a wide variety of use-cases, e.g., in migration of Virtual Machines (VMs) between physical compute nodes, in page-swapping between a memory and a storage device, in various caching schemes, to name only a few examples.

SUMMARY OF THE INVENTION

An embodiment of the present invention that is described herein provides a compute node including a memory, a processor and a peripheral device. The memory is to store memory pages. The processor is to run software that accesses the memory, and to identify one or more first memory pages that are accessed by the software in the memory. The peripheral device is to directly access one or more second memory pages in the memory of the compute node using Direct Memory Access (DMA), and to notify the processor of the second memory pages that are accessed using DMA. The processor is further to maintain a data structure that tracks both (i) the first memory pages as identified by the processor and (ii) the second memory pages as notified by the peripheral device.

In some embodiments, the peripheral device is a network adapter, and the second memory pages include data that is communicated by the network adapter between the processor and a network.

In some embodiments, the software includes a quest that is hosted on the compute node, the guest having a memory space allocated in the memory, and the processor is to track, in the data structure, dirty pages belonging to the memory space of the quest, the dirty pages including both (i) first dirty pages that were written-to by the guest, and (ii) second dirty pages that were written-to by the peripheral device. In an example embodiment, the processor is to carry out a process that migrates the guest to another compute node, in cooperation with the other compute node and using the data structure that tracks the first dirty pages and the second dirty pages. In an embodiment, the peripheral device is to limit a rate of traffic for the guest being migrated.

In a disclosed embodiment, the processor is to carry out a process that swaps some of the memory pages with a storage device, using the data structure that tracks the first memory pages and the second memory pages.

In some embodiments, the peripheral device is to coalesce indications of accesses to the second memory pages, and to notify the processor by sending the coalesced indications. In an example embodiment, the peripheral device is to coalesce the indications by buffering the indications in a coalescing buffer. In another embodiment, the peripheral device is to coalesce the indications by setting bits, which represent the second memory pages, in a bitmap.

In yet another embodiment, the peripheral device is to notify the processor of the second memory pages by writing directly into the data structure maintained by the processor. In still another embodiment, the peripheral device is to notify the processor of the second memory pages by reporting respective addresses of the second memory pages.

There is additionally provided, in accordance with an embodiment of the present invention, a method including, using processor, running software that accesses a memory, and identifying one or more first memory pages that are accessed by the software in the memory. Using a peripheral device, one or more second memory pages are accessed directly in the memory using Direct Memory Access (DMA), and the processor is notified of the second memory pages that are accessed using DMA. A data structure, which tracks both (i) the first memory pages as identified by the processor and (ii) the second memory pages as notified by the peripheral device, is maintained by the processor.

There is also provided, in accordance with an embodiment of the present invention, a method for joint tracking of (i) memory pages that are accessed by software of a processor and (ii) memory pages that are accessed by a peripheral device independently of the processor. The method includes running on the processor software that accesses a memory, and identifying one or more memory pages that are accessed by the software. One or more memory pages are accessed directly, the peripheral device using Direct Memory Access (DMA), and the processor is notified of the memory pages that are accessed using DMA. A data structure, which tracks both (i) the memory pages accessed by the software, as identified by the processor, and (ii) the memory pages accessed by the peripheral device, as notified by the peripheral device, is maintained by the processor.

The present invention will be more fully understood from the following detailed description of the embodiments thereof, taken together with the drawings in which:

DETAILED DESCRIPTION OF EMBODIMENTS

Overview

Figure 1:
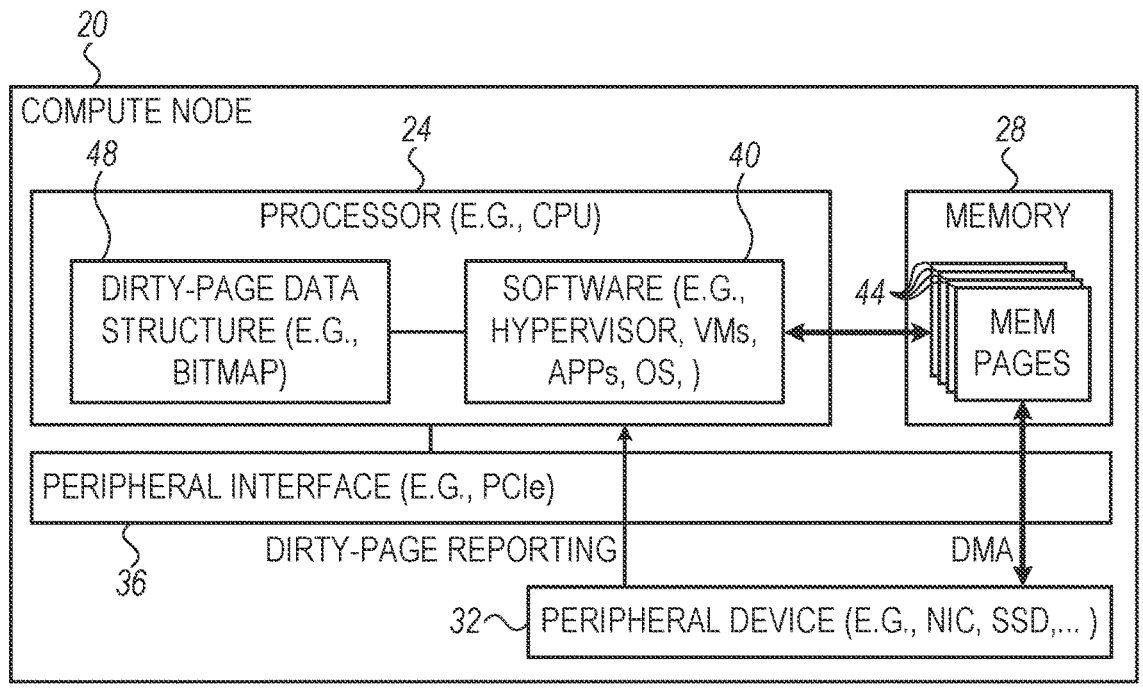
FIG. 1 is a block diagram that schematically illustrates a compute node that carries out memory-page tracking assisted by a peripheral device, in accordance with an embodiment of the present invention.

Embodiments of the present invention that are described herein provide improved methods and systems for tracking memory-page access in a compute node. In the present context, memory pages that have been accessed are also referred to as "dirty pages," and the two terms are used interchangeably herein. The exact definition of a "dirty page," and the definition of when a page is no longer considered dirty, may differ depending on the application.

In some applications a page becomes dirty when it is modified, and is considered dirty until some consistency has been achieved, e.g., when the modified page has been committed to storage. In other applications, e.g., applications that track least-recently-used (LRU) or most-recentlyused. (MRU) pages, reading a page is sufficient to render the page dirty. Generally, the disclosed techniques can be used in any suitable application that involves tracking of access to memory pages. Example use-cases relating to Virtual Machine (VM) migration and page-swapping are described herein.

In some embodiments, a compute node comprises a memory and a processor. The processor runs software that, among other tasks, accesses (e.g., reads and/or writes) memory pages in the memory. The software may comprise, for example, a hypervisor or an Operating System (OS). In addition, the compute node comprises a peripheral device that accesses the memory using Direct Memory Access (DMA).

In one example, the peripheral device is a network adapter that receives data from a network and writes the data directly into the compute nodes memory. In another example, the peripheral device is a storage device such as a Solid-State Drive (SSD) that stores data for a CPU of the compute node. When performing read operations for the CPU, data is pulled from the storage device and written using DMA into the CPU memory. These DMA operations may transfer large amounts of data to the CPU memory, without CPU intervention.

In some implementations, the processor (including the software running thereon) is unaware of the memory-access operations performed by the peripheral device, because these operations are performed using DMA. The processor can therefore identify and track the memory pages accessed ("dirtied") by the software, but not the memory pages accessed by the peripheral device. Such partial tracking of dirty pages is problematic and may lead to data inconsistency and suboptimal performance.

To address this challenge, in some embodiments of the present invention, the peripheral device notifies the processor which memory pages have been accessed by the peripheral device using DMA. The processor maintains a data structure that tracks both (i) memory pages accessed by the software (as identified by the processor) and (ii) memory pages accessed by the peripheral device (as notified by the peripheral device). In this manner, the processor is able to fully track all dirty pages in the memory, regardless of the entity that rendered these pages dirty.

In some embodiments, the above-described memory-page tracking scheme is implemented entirely in hardware. The peripheral device may use various protocols and formats for reporting the memory pages it accesses. Several examples are described herein.

System Description

FIG. 1 is a block diagram that schematically illustrates a compute node 20 that tracks dirty pages in accordance with an embodiment of the present invention. FIG. 1 is relatively generic, in the sense that it is not application-specific and is applicable to various types of compute nodes and peripheral devices. Several concrete examples are described further below.

Compute node 20 may comprise, for example, a server in a data center, a workstation, or any other suitable type of compute node. Node 20 comprises a processor 24 and a memory 28. In the present example processor 24 comprises a Central Processing Unit (CPU), but the processor may alternatively comprise a Graphics Processing Unit (GPU) any other suitable type of processor. Memory 28 comprises a Random-Access Memory (RAM) in the present example, but may alternatively comprise any other suitable type of memory.

Node 20 further comprises a peripheral device 32 that communicates with processor 24 and with memory 28 over a peripheral interface 36. Peripheral device 32 may comprise, for example, a network adapter such as an Ethernet Network Interface Controller (NIC), an InfiniBand Host Channel Adapter (HCA), a Smart-NIC, a Data Processing Unit (DPU), a network-enabled GPU, or any other suitable type of network adapter. As another example, peripheral device 32 may comprise a storage device, such as a Solid-State Drive (SSD) or a Small Computer System Interface (SCSI) disk. Further alternatively, peripheral device 32 may comprise an accelerator implemented in a GPU or Field-Programmable Gate Array (FPGA), any other suitable type of peripheral device. Peripheral interface 36 may comprise, for example, a Peripheral Component Interconnect express (PCIe) bus.

In some embodiments, processor 24 runs software 40 that, among other tasks, accesses memory pages 44 in memory 28. Software 40 may comprise, for example, a hypervisor, one or more VMs, one or more applications ("apps"), an OS, and/or any other suitable type of software. Software 40 may read and/or write memory pages 44, as appropriate. In the description that follows, memory pages 44 are also referred to simply as "pages," for brevity.

In addition to the memory accesses (read and/or write) by software 40, memory pages 44 are also accessed (read and/or written) by peripheral device 32 using DMA. Peripheral device 32 may access the same memory pages as software 40, partially overlapping memory pages, or different memory pages. Typically, accesses to memory pages 44 by software 40 and by peripheral device 32 are not coordinated with one another. In particular, processor 24 is typically unaware of which memory pages 44 have been accessed ("dirtied") by peripheral device 32.

In order to enable full, i.e., impartial tracking of dirty pages, peripheral device 32 reports the pages it is accessing to processor 24. Peripheral device 32 typically sends such report messages over interface 36, e.g., periodically. Several examples of efficient reporting formats are described below.

Based on the reports from peripheral device 32, processor 24 maintains a dirty-page data structure 48 that tracks both (i) memory pages accessed by software 40 (as identified by processor 24) and (ii) memory pages accessed by peripheral device 32 (as reported by the peripheral device). In some embodiments, dirty-page data structure 48 comprises a bitmap in which each bit corresponds to a respective memory page. A set bit in the bitmap means that the corresponding page is dirty, and vice versa.

Processor 24 may identify the pages that are accessed ("dirtied") by software 40 in various ways. For example, the processor may maintain a page table having multiple Page-Table Entries (PTEs). When software 40 dirties a certain memory page, processor 24 may set a respective bit in the corresponding PIE to indicate that the page is dirty.

Figure 2:
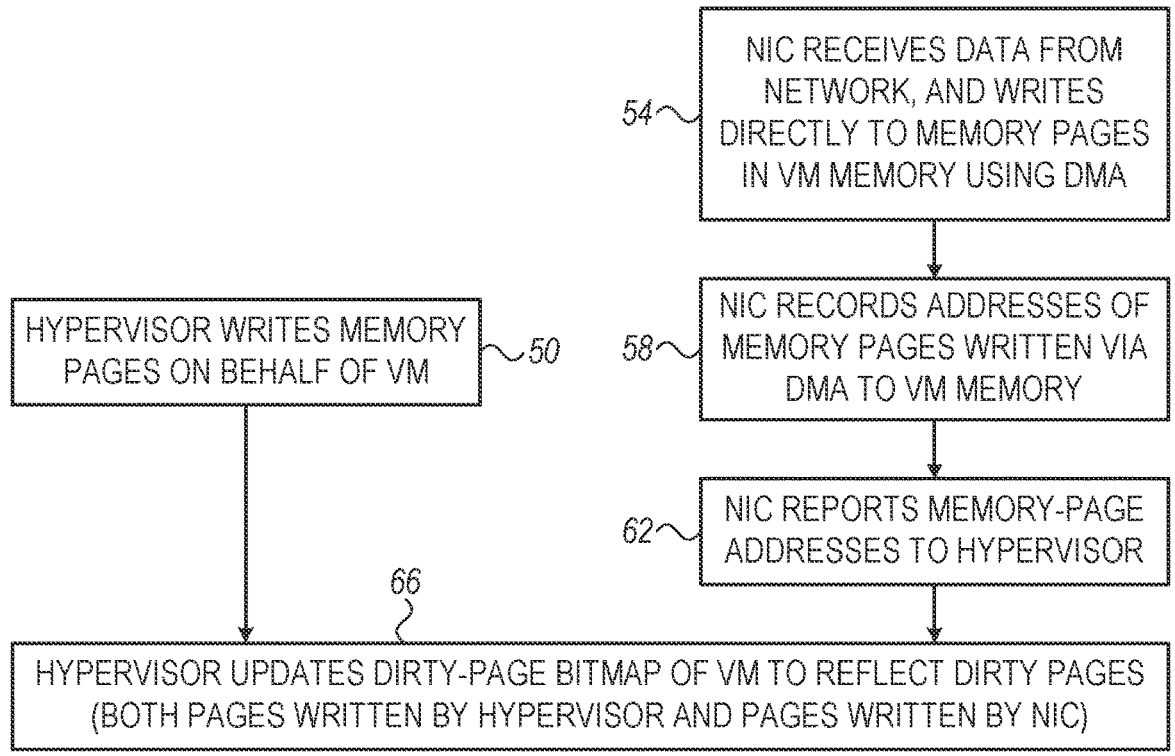
FIG. 2 is a flow chart that schematically illustrates a method for tracking memory pages, in accordance with an embodiment of the present invention.

FIG. 2 is a flow chart that schematically illustrates a method for tracking memory pages in compute node 20, in accordance with an embodiment of the present invention. In the present example, software 40 is a hypervisor that hosts VMs, (ii) peripheral device 32 is a NIC, (iii) peripheral interface 36 is a PCIe bus, and (iv) dirty pages are defined as pages that are written-to, i.e., modified.

As seen in the figure, memory 28 is written-to both by the hypervisor and by the NIC, typically without mutual coordination or awareness. At a hypervisor access operation 50, the hypervisor writes to some of memory pages 44 on behalf of the VMs. At a MID access operation 54, the NIC receives data from the network and writes the data using DMA to some of memory pages 44.

In the present example, the NIC operates in a pass-through mode, using Single Root Input/Output virtualization (SR-IOV). In this mode, the NIC exposes a respective virtual NIC (vNIC) for each VM. Each vNIC is configured to write data directly into the memory space of the corresponding VM, using DMA. The hypervisor is unaware of these DMA operations, and cannot track pages that are written by the NIC.

To enable impartial dirty-page tracking, the NIC records the addresses of the memory pages that were written-to, at a recording operation 58. Typically, the NIC tracks and records the addresses in accordance with the physical memory space defined for the VM (i.e., Guest Physical Addresses—GPAs).

At a reporting operation 62, the NIC reports the recorded addresses to the hypervisor. At an updating operation 66, the hypervisor updates dirty-page bitmap 48 to reflect both the pages dirtied by the hypervisor (at operation 50) and the pages dirtied by the NIC (at operation 54). In the present example, the hypervisor maintains a separate bitmap 48 per M. In a given bitmap 48, the addresses of the memory pages are GPAs in the guest physical address space of that VM.

The method of FIG. 2 is an example method that is depicted purely for the sake of conceptual clarity. In alternative embodiments, any other suitable method can be used.

Typically, peripheral device 32 (NIC in the present example) receives a request from software 40 (hypervisor in the present example) to start tracking dirty pages for a specified guest (e.g., VM). In response, device 32 starts tracking writes (and/or other accesses as appropriate) to the memory of the specified guest. Tracking of dirty pages is performed according to GPA. In some embodiments, dirty-page tracking is performed according to GPA even if the writes are actually issued to Machine Addresses (MA) e.g., when peripheral device 32 supports Address Translation Services (ATS). Tracking of dirty pages is typically performed per packet. Processing a given packet may require marking multiple pages as dirty. Peripheral device 32 typically writes the addresses of dirty pages (e.g., of writes) to an internal database. If multiple packets are written to the same physical memory page, device 32 may reduce the reports to software 40 by reporting the page as dirty only once. This improvement may be done exhaustively, or in a best-effort manner. Software 40 then updates dirty-page data structure 48 according to the addresses reported by device 32.

Live Migration Use-Case

One possible use-case for the disclosed dirty-page tracking technique is migration of a VM from one compute node to another. In a typical live migration process, both the VM image (including, for example, memory used by the kernel and various drivers, including I/O drivers) and the VMs memory space are transferred from a source compute node to a destination compute node.

Some migration processes (referred to as "pre-copy" migration) transfer the VMs memory space first, then suspend the VM temporarily, transfer the VM image, and then resume the VM on the destination compute node. Other migration processes (referred to as "post-copy" migration) start with suspending the VM and transferring the VM image to the destination compute node, and only then transfer the VM memory space. Hybrid schemes are also possible. For most practical applications, the simple solution of freezing the VM and then copying its entire memory to the destination compute node is not feasible, since it causes an unacceptably long off-line period.

In any migration process, memory pages of the VM may become dirty after migration has started. Thus, a migration process typically involves tracking of dirty pages in the VM address space. Any such tracking can be performed using the disclosed techniques.

Figure 3:
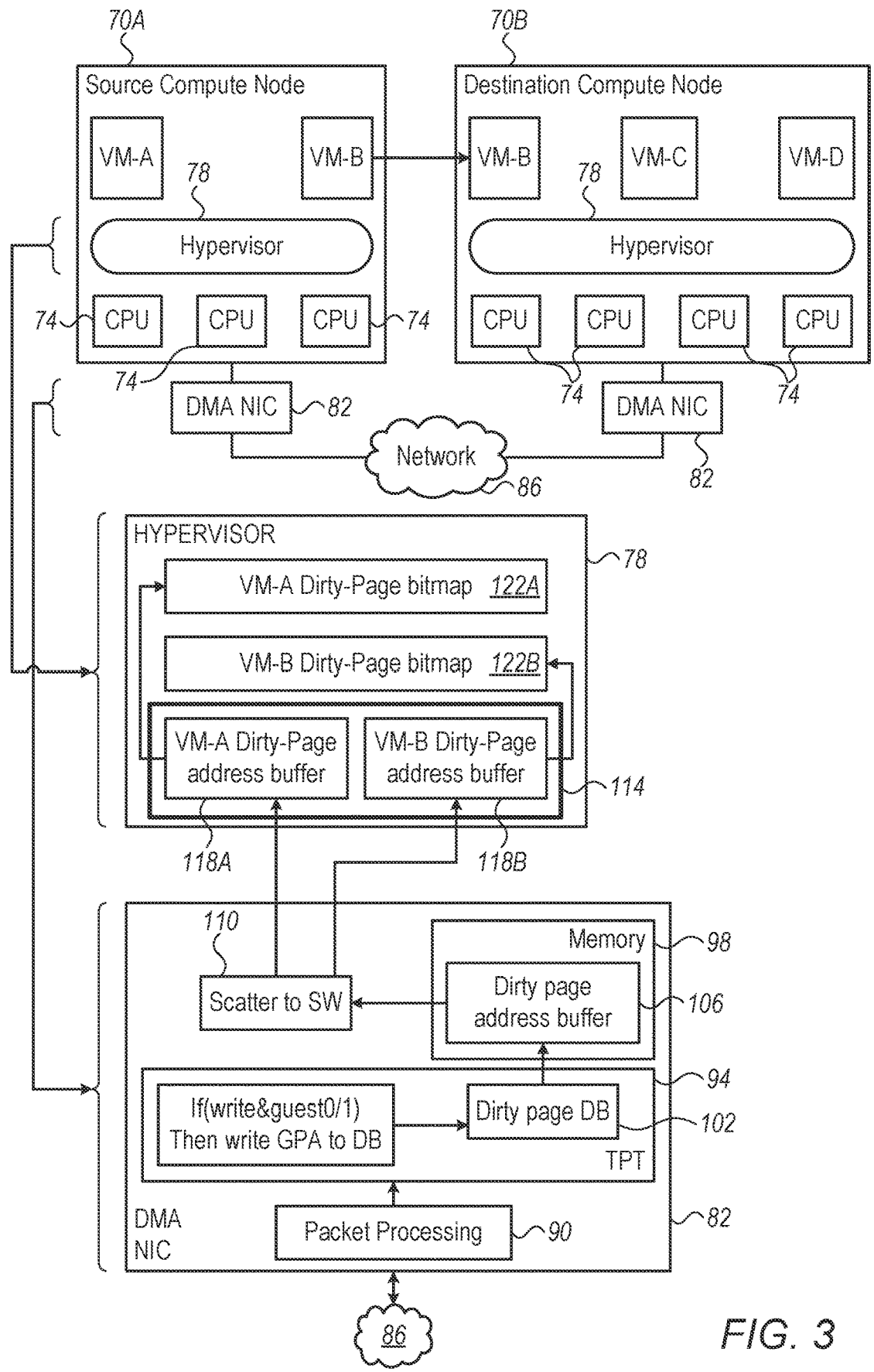
FIG. 3 is a block diagram that schematically illustrates migration of a Virtual Machine (VM) between compute nodes, in accordance with an embodiment of the present invention.

FIG. 3 is a block diagram that schematically illustrates migration of a VM between compute nodes, in accordance with an embodiment of the present invention. The top of the figure shows two compute nodes denoted 70A and 70B that host multiple VMs. Each compute node comprises one or more CPUs 74 and a hypervisor (HV) 78. The compute nodes are connected by respective DMA NICs 82 to a network 86. The system is assumed to operate using SR-IOV.

Initially, node 70A hosts two VMs denoted VM-A and VM-B, and node 70B hosts two other VMs denoted VM-C and VM-D. At a certain point in time, a decision is made to migrate VM-B from node 70A to node 70B. In this migration process, compute node 70A acts as the source compute node, and compute node 70B acts as the destination compute node. In the description that follows, HV 78 of node 70A is referred to as the "source HP" and HV 78 of node 70B is referred to as the "destination HV."

In the present example, VM-B is being migrated in a pre-copy migration process that is performed jointly by, the source hypervisor and the destination hypervisor. Generally, the pre-copy migration process comprises the following sequence of operations:

The source HV begins tracking the memory pages accessed by the VM.

The source HV copies the entire memory space of the VM (dirty pages or otherwise) to the destination node.

From this point, the source HV copies only pages that become dirty (relative to the version that was already transferred).

Once a stopping condition is reached (e.g., the number of dirty pages drops below some small threshold, or the number of dirty pages does not decrease rapidly enough due to a high rate of accesses, or other condition), the source HV suspends the VM temporarily.

At this point the source HV transfers the VM image to the destination node.

The network is reconfigured to transfer subsequent traffic destined for the VM to the destination node.

The destination HV resumes the VM from the same state at which the VM was suspended by the source HV.

As explained above, when using SR-IOV, HV 78 on the source node is unaware of pages that are dirtied by NIC 82 in the VM memory space. Unless these pages are accounted for using the disclosed techniques, the source HV is likely to fail tracking all the dirty pages, leading to data corruption in the migration process.

Two insets in the middle and at the bottom of FIG. 3 show the internal structure of HV 78 and NIC 82 of the source node in accordance with an example embodiment. The insets focus on NIC and HV elements relating to dirty-page tracking. In the present example, NIC 82 and HV 78 track the dirty pages of both VM-A and As seen at the bottom inset, NIC 82 comprises packet processing hardware 90 that transmits and receives packets to and from network 86. The NIC further comprises a Translation and Protection Table (TPT) 94, a NIC memory 98 and scattering hardware 110. TPT 94 holds address translations between virtual addresses specified in the packets and GPAs in the VM memories. In some embodiments, TPT 94 further comprises a dirty-page database 102. In response to identifying that an incoming packet from the network warrants a write to the memory space of VM-A or VM-B (marked in the figure as "guest0" and "guest1"), the NIC writes the GPA of this write operation to dirty-page database 102 in TPT 94. Note that dirty-page tracking using TPT is only one example. In alternative embodiments, NIC 32 may track the memory pages it dirties in any other suitable way.

The GPAs of the dirty-pages are copied to a dirty-page address buffer 106 in NIC memory 98. Scattering hardware 110 then separates between the GPAs of the dirty pages of VM-A, and the GPAs of the dirty pages of VM-B, and delivers them separately to HV 78. In an embodiment, scattering hardware 110 delivers the GPAs of the dirty pages on-demand, e.g., in response to a request from HV 78 for the currently-buffered dirty pages of a given VM.

HV 78 (seen in the inset in the middle of FIG. 3) comprises a dirty-page memory 114 that stores separate dirty-page address buffers for different VMs. In the present example, dirty-page address buffers 118A and 118B buffer the GPAs of the dirty pages of VM-A and VM-B, respectively, as provided by scattering hardware 110 of NIC 82.

Based on the GPAs buffered in buffer 118A, HAT 78 updates a dirty-page bitmap 122A for VM-A. Dirty-page bitmap 122A thus tracks both the dirty pages of VM-A that are dirtied by the HV itself, and the dirty pages of VM-A that are dirtied by NIC 82. Similarly, HV 78 updates a dirty-page bitmap 122B for VM-B based on the GPAs buffered in buffer 118B. Dirty-page bitmap 122B tracks both the dirty pages of VM-B that are dirtied by HV 78, and the dirty pages of VM-B that are dirtied by NIC 82.

In some embodiments, source By 78 performs the above-described migration process while tracking the dirty pages of VM-B in bitmap 122B. In this manner, no dirty pages are missed despite the use of pass-through virtualization (e.g., SR-IOV).

The migration process described above is an example process that is depicted purely for the sake of clarity. In alternative embodiments, any other suitable process can be used. For example, the disclosed techniques are not limited to pre-copy migration, and may be used in other migration processes, as well. As another example, the description above referred to migration of VMs, but the disclosed techniques can be used in migration of other types of guests, e.g., containers or processes.

An alternative solution, instead of using the disclosed page-tracking technique, is to replace the pass-through peripheral device (e.g., SR-IOV NIC) prior to migration with a device that is fully virtualized in software. This solution, however, is costly in terms of performance. More importantly, this solution exposes the migration process to the VM itself, which is usually unacceptable.

In some embodiments, NIC 82 in source compute node 70A may assist in speeding-up the migration process, by limiting the rate of traffic for the VM (or other guest) being migrated. Limiting the rate of traffic for a VM will in turn reduce the rate of page-dirtying for the VM, and will therefore reduce the overall migration time. In example embodiments, NIC 82 may limit the inbound packet rate of a migrating VM by applying policers for lossy traffic (e.g., TCP) or by changing the parameters or congestion control for lossless traffic (e.g., InfiniBand or lossless RoCE). Policing of this sort may be static (enforcing a static maximum rate) or dynamic.

In a dynamic policing process, NIC 82 may change the allowed inbound rate of a guest based on one or both of the following parameters:

1. Dirty page rate. The NIC may monitor the rate of dirty pages marked per guest. If the rate exceeds a defined threshold, the NIC may change the inbound packet rate policy in order to further reduce the dirtying rate.

2. Number of pre copy iterations. The NIC may, monitor the number of pre copy iterations performed by the hype visor (e.g., through a software API that alerts the NIC of each pre-copy iteration). The NIC may reduce the inbound traffic rate in order to reduce the dirtying rate if too many iterations occur (e.g., when the number of pre-copy iterations exceed a defined number).

Other Example Use-Cases

Another possible use-case for the disclosed dirty-page tracking technique is a page-swapping application. In an example page-swapping application, processor 24 (FIG. 1) runs page-swapping software (e.g., as part of an OS) that swaps memory pages between memory 28 and a storage device (e.g., SSD). Typically, the page-swapping software aims to retain frequently-accessed pages (or recently-used pages) in the memory, and to export rarely-used pages (or pages accessed a long time ago) to the storage device. If, however, some of the memory-page accesses are performed by peripheral device 32 (e.g., NIC) transparently to processor 24, the page-swapping performance will not be optimal.

Thus, in some embodiments, processor 24 may track dirty pages using the disclosed techniques, so as to also account for pages that are dirtied by peripheral device 32. Page-swapping that is based on this sort of dirty-page tracking will perform well, even when some page accesses are transparent to processor 24.

Yet another possible use-case is in tracking re-ordering accesses to Dynamic Random-Access Memory (DRAM) to save power. An additional use-case is in statistics gathering of memory-access operations. Further alternatively, the disclosed techniques can be used for tracking of access to memory pages in any other suitable use-case.

Tracking and Coalescing in Peripheral Device

In some embodiments, before writing to the memory of a guest (e.g., VM), peripheral device 32 checks the function whose writes should be tracked, e.g., the Bus:Device.Function (BDF) or the BDF in combination with Process Address Space ID (PASID). If device 32 recognizes the function as one that re quires dirty-page tracking (e.g., a guest in the process of migration), device 32 records the GPA[64:12] and function being accessed.

In order to reduce software processing, device 32 may perform coalescing in tracking and recording of dirty pages. In an example embodiment device 32 maintains an intermediate coalescing buffer of a certain size (e.g., 32, 64 or 128 entries). Each entry of the coalescing buffer comprises a pair of {function, GPA}. On each insertion of {function, GPA} to the coalescing buffer, device 32 checks whether the detected combination of {function, GPA} already exists in the coalescing buffer.

If so, no further action is needed. If not, the device inserts the new {function, GPA} into the coalescing buffer. When the coalescing buffer becomes full, or upon end of a pre-copy migration iteration, device 32 pops the coalescing buffer and reports all entries to software 40.

In an alternative embodiment, peripheral device 32 performs coalescing by maintaining a dirty-page bitmap per guest (as, for example, in the example of FIG. 3). The bitmap represents the Guest Physical Address (GPA) space of the guest, with each bit corresponding to a respective memory page. A set bit in the bitmap means that the corresponding page is dirty, and vice versa. Upon detecting a page becoming dirty, device 32 sets the corresponding bit. Multiple writes to the same page will set the same bit, and therefore device 32 will report this page as dirty to the software 40 only once.

In practice, the bitmap per guest may be very large. For example, for one bit per 4 KB page, and a 64-bit address range, the bitmap will require $2^{49}$ Bytes of memory. In such cases, an additional optimization can be implemented, in which the software (e.g., device driver) notifies device 32 of selected regions in the quest memory for which dirty-page tracking is required. With this improvement device 32 can maintain only a fraction (or multiple fractions) of the bitmap required for the total memory space of each guest. Device 32 may report the dirty hits at any suitable interval or upon any suitable event, e.g., once every pre-copy iteration (in the pre-copy migration use-case) and/or on request by software 40.

In an example embodiment, a quest RAM space of 128 G bytes will require a total of 4 MB for a compressed bitmap. Device 32 may allocate memory in memory 28 (the host memory) in order to maintain multiple bitmaps. In such an embodiment, writing to a bitmap by device 32 may require fetching an entry from the host memory (in order to modify it and write it back). In severe cases, e.g., of multiple fetches and high latency on interface 36, backpressure may be caused to the device. Care should be taken so that fetches from the host memory will be free of risk of backpressure, in order to avoid deadlock.

Dirty-page Reporting Schemes

In various embodiments, peripheral device 32 may use various schemes and formats for reporting the dirty pages it tracks to software 40.

In some embodiments, peripheral device 32 writes directly to dirty-page data structure 48 of processor 24 (e.g., to the dirty-page bitmap maintained by the hypervisor). When using PCIe, this technique may require performing read-modify-write operations over the PCIe bus, since PCIe writes are performed in Byte granularity.

In one embodiment, to reduce the overhead of read-modify-write operations over the PCIe bus, peripheral device 32 uses PCIe TIP byte-enable in order to write single bytes rather than DWORDs. This mode allows writing directly to the dirty-page data structure without read-modify-write. For byte-map based tracking (in which entire bytes in data structure 48 represent respective memory pages), this technique provides optimal performance. For bitmap-based tracking, this technique introduces some false positives (i.e., marks some pages, which were not written-to, as dirty).

In alternative embodiments, peripheral device 32 reports the addresses and functions it accesses, and allows software 40 (e.g., a device driver) to update dirty-page data structure 48 accordingly. This technique allows a more flexible interface between device 32 and software 40, but on the other hand may consume more PCIe bandwidth than direct writing into data structure 48.

Further alternatively, peripheral device 32 may use any other suitable reporting scheme for reporting dirty pages to software 40.

The configurations shown in FIGS. 1 and 3, e.g., system configurations, compute-node configurations, NIC configurations and HV configurations, are example configurations that are depicted purely for the sake of conceptual clarity. Any other suitable configurations can be used in alternative embodiments. The various system and compute-node elements described herein may be implemented using software, using suitable hardware such as in one or more Application-Specific Integrated Circuits (ASIC) or Field-Programmable Gate Arrays (FPGA), or using a combination of software and hardware elements.

Certain system elements, e.g., CPUs 24 and 74, and/or processors in NICs 82, may comprise general-purpose processors, which are programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Although the embodiments described herein mainly address tracking of dirty pages in compute nodes, the methods and systems described herein can also be used in various other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A compute node, comprising:
   a memory, to store memory pages;
   a peripheral bus;
   a processor, which is to run software that accesses the memory, and to identify one or more first memory pages that are accessed by the software in the memory; and
   a peripheral device, which is to:
      directly access one or more second memory pages in the memory of the compute node using Direct Memory Access (DMA); and
      notify the processor of the second memory pages that were accessed using DMA,
   wherein the processor is further to maintain a data structure that tracks both (i) the first memory pages as identified by the processor and (ii) the second memory pages as notified by the peripheral device, and wherein the peripheral device is to notify the processor of the second memory pages by writing over the peripheral bus directly into the data structure.

2. The compute node according to claim 1, wherein the peripheral device is a network adapter, and wherein the second memory pages comprise data that is communicated by the network adapter between the processor and a network.

3. The compute node according to claim 1, wherein the software comprises a guest that is hosted on the compute node, the guest having a memory space allocated in the memory, and wherein the processor is to track, in the data structure, dirty pages belonging to the memory space of the guest, the dirty pages comprising both (i) first dirty pages that were written-to by the guest, and (ii) second dirty pages that were written-to by the peripheral device.

4. The compute node according to claim 3, wherein the processor is to carry out a process that migrates the guest to another compute node, in cooperation with the other compute node and using the data structure that tracks the first dirty pages and the second dirty pages.

5. The compute node according to claim 4, wherein the peripheral device is to limit a rate of traffic for the guest being migrated.

6. The compute node according to claim 1, wherein the processor is to carry out a process that swaps some of the memory pages with a storage device, using the data structure that tracks the first memory pages and the second memory pages.

7. The compute node according to claim 1, wherein the peripheral device is to notify the processor of the second memory pages by reporting respective addresses of the second memory pages.

8. The compute node according to claim 1, wherein the peripheral device is to coalesce indications of accesses to the second memory pages, and to notify the processor of the second memory pages by sending the coalesced indications.

9. The compute node according to claim 8, wherein the peripheral device is to coalesce the indications by buffering the indications in a coalescing buffer residing in the peripheral device.

10. The compute node according to claim 8, wherein the peripheral device is to coalesce the indications by setting bits, which represent the second memory pages, in a bitmap residing in the peripheral device.

11. A method, comprising:
using a processor, running software that accesses a memory, and identifying one or more first memory pages that are accessed by the software in the memory;
using a peripheral device that communicates with the processor over a peripheral bus:
  directly accessing one or more second memory pages in the memory using Direct Memory Access (DMA);
  notifying the processor of the second memory pages that were accessed using DMA; and
maintaining, by the processor, a data structure that tracks both (i) the first memory pages as identified by the processor and (ii) the second memory pages as notified by the peripheral device,
wherein notifying the processor of the second memory pages comprises writing over the peripheral bus directly into the data structure.

12. The method according to claim 11, wherein the peripheral device is a network adapter, and wherein the second memory pages comprise data that is communicated by the network adapter between the processor and a network.

13. The method according to claim 11, wherein the software comprises a guest that is hosted on a compute node, the guest having a memory space allocated in the memory, and wherein maintaining the data structure comprises tracking, in the data structure, dirty pages belonging to the memory space of the guest, the dirty pages comprising both (i) first dirty pages that were written-to by the guest, and (ii) second dirty pages that were written-to by the peripheral device.

14. The method according to claim 13, and comprising carrying out, by the processor, a process that migrates the guest to another compute node, in cooperation with the other compute node and using the data structure that tracks the first dirty pages and the second dirty pages.

15. The method according to claim 14, and comprising, using the peripheral device, limiting a rate of traffic for the guest being migrated.

16. The method according to claim 11, and comprising carrying out, by the processor, a process that swaps some of the memory pages with a storage device, using the data structure that tracks the first memory pages and the second memory pages.

17. The method according to claim 11, wherein notifying the processor of the second memory pages comprises reporting respective addresses of the second memory pages.

18. The method according to claim 11, wherein notifying the processor of the second memory pages comprises coalescing indications of accesses to the second memory pages, and notifying the processor by sending the coalesced indications.

19. The method according to claim 18, wherein coalescing the indications comprises buffering the indications in a coalescing buffer residing in the peripheral device.

20. The method according to claim 18, wherein coalescing the indications comprises setting bits, which represent the second memory pages, in a bitmap residing in the peripheral device.

21. A method for joint tracking of (i) memory pages that are accessed by software of a processor and (ii) memory pages that are accessed by a peripheral device independently of the processor, the method comprising:
running on the processor software that accesses a memory, and identifying one or more memory pages that are accessed by the software;
directly accessing, by the peripheral device, one or more memory pages using Direct Memory Access (DMA);
notifying the processor of the memory pages that were accessed directly by the peripheral device; and
maintaining, by the processor, a data structure that tracks both (i) the memory pages accessed by the software, as identified by the processor, and (ii) the memory pages accessed by the peripheral device, as notified by the peripheral device,
wherein notifying the processor of the second memory pages comprises writing over the peripheral bus directly into the data structure.

* * * * *